March 14, 1933. A. W. DE VOUT ET AL 1,901,705
EGG TRAY
Filed Feb. 24, 1931
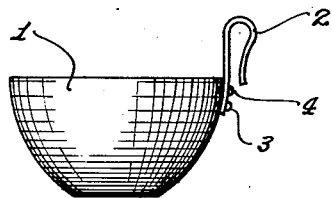
Fig.1
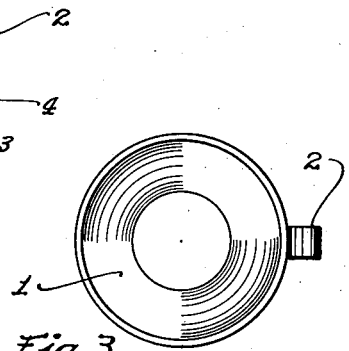
Fig.3
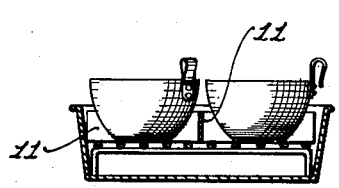
Fig.2
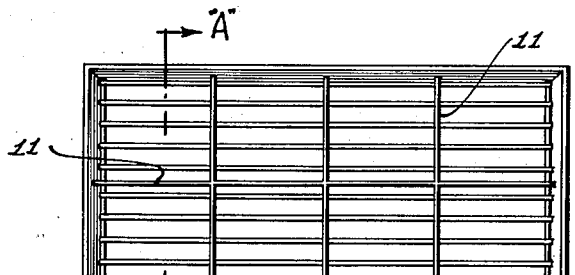
Fig.4
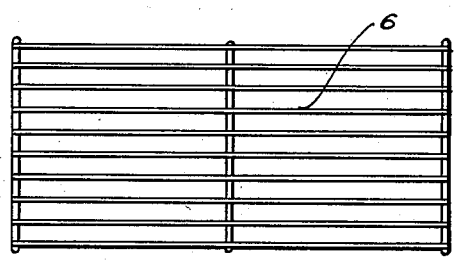
Fig.5
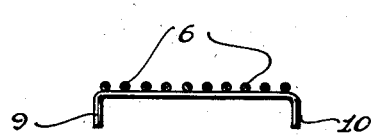
Fig.6
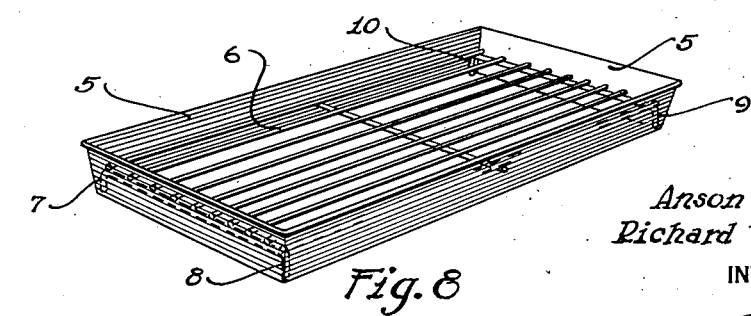
Fig.7
Fig.8
Anson W. DeVout and
Richard W. Regensburger
INVENTOR
BY
ATTORNEY
WITNESS

Patented Mar. 14, 1933

1,901,705

UNITED STATES PATENT OFFICE

ANSON W. DE VOUT AND RICHARD W. REGENSBURGER, OF CHICAGO, ILLINOIS, ASSIGNORS, BY MESNE ASSIGNMENTS, TO INDUSTRIAL PATENTS CORPORATION, OF CHICAGO, ILLINOIS, A CORPORATION OF DELAWARE

EGG TRAY

Application filed February 24, 1931. Serial No. 517,781.

Our invention relates to means for conveniently conveying contents of eggs from egg breakers to egg separators in appropriate individual containers.

One of the objects of our invention is to provide an egg cup which is inexpensive to manufacture, convenient to handle and easy to clean.

Another object of our invention is to provide trays to hold such cups.

Referring now to the drawing which is made a part of this specification and in which similar numerals of reference refer to identical parts in the several figures.

Figure 1 is a side view of the cup.

Figure 2 is an end view with elevation of handle.

Figure 3 is a top plan view of the cup.

Figure 4 is a plan view of a tray provided with partitions and grating.

Figure 5 is a section view through A—A of Figure 4.

Figure 6 is a plan view of an appropriate grating which is as shown in Figure 4.

Figure 7 is an end view of the grating shown in Figure 6.

Figure 8 is a phantom view of the tray in which a grating, as the one shown in Figure 6, has been placed.

Referring now to egg cup as shown in Figures 1, 2 and 3. The cup consists of receptacle 1, manufactured preferably of seamless stamped metal, provided with a handle 2. You will notice that handle 2 is affixed to receptacle 1 on the outside near the top thereof by appropriate means, such as rivets 3 and 4. It will be noted also that the handle is disposed upwardly in a plane substantially at right angles to the plane of the top of the receptacle. The handle is so disposed to permit grasping by an operator without disturbing other cups in proximity and in order that the cups may occupy less space in use.

The pan 5 shown in Figure 8 can be made of any appropriate material, but preferably metal. The grating 6 shown in Figure 6 is provided with legs 7, 8, 9 and 10 and placed in the bottom of the pan such that cups placed on said grating will not come in contact with the bottom of pan 5, thus avoiding contamination of any product which may fall to the bottom of pan 5.

Figures 4 and 5 show a series of partitions 11, designed to divide the tray shown in Figure 4 into eight spaces, each specially adapted to receive one cup. It is desirable to so separate the cups and thus prevent inadvertent spilling, although tray may be used if desired without such partitions, as shown in Figure 8.

It is to be understood that changes may be made in the design of the particular embodiment of my invention shown in the drawing without departing from the spirit of my invention, as described in the following claims.

I claim:

1. An egg cup of one piece of material that is shaped so as to provide a body portion and a bottom portion and which in any horizontal cross section is circular but which in vertical cross section gradually decreases in passing from the top of the cup to the bottom portion thereof and which cup is provided with a handle composed of a flat strip of material bent back upon itself intermediate its ends to form a relative short handle projecting above the mouth or top of the cup, the outer bent back portion being slightly spaced from the upstanding portion of the handle, the lower end of the upstanding portion of the handle being secured to the outside of the body portion of the cup, the lower end of the outer bent back portion of the handle terminating near the upper edge portion of the cup, the handle being shaped so that no portion thereof in horizontal plan extends substantially beyond intersecting lines tangent to the upper exterior part of the body portion of the cup and which lines are perpendicular to each other.

2. An egg cup of one piece of material providing a body portion and an integral bottom portion, which body portion of said cup in horizontal cross section is circular but which gradually decreases in size in passing from the top of the cup to the bottom thereof, said cup being provided with a handle composed of a thin strip of material secured at its lower end to the upper body portion of the cup thence extending upwardly and finally being reversely bent so as to form a relatively short handle projecting above the mouth of the cup and so that the backwardly bent or outer portion of the handle is slightly spaced from the upstanding portion thereof, the lower end of the back bent portion being spaced from the upstanding portion of the handle and terminating adjacent the upper edge of the cup.

Signed at Chicago, Illinois, this 19th day of February, 1931.

ANSON W. DE VOUT.
RICHARD W. REGENSBURGER.